United States Patent
Ashley et al.

(10) Patent No.: US 7,561,649 B2
(45) Date of Patent: Jul. 14, 2009

(54) METHOD AND APPARATUS FOR SYNCHRONIZATION MARK DETECTION WITH DC COMPENSATION

(75) Inventors: Jonathan James Ashley, Los Gatos, CA (US); Ching-Fu Wu, Santa Clara, CA (US); Kaichi Zhang, San Jose, CA (US)

(73) Assignee: Agere Systems Inc., Allentown, PA (US)

( * ) Notice: Subject to any disclaimer, the term of this patent is extended or adjusted under 35 U.S.C. 154(b) by 462 days.

(21) Appl. No.: 10/836,130

(22) Filed: Apr. 30, 2004

(65) Prior Publication Data

US 2005/0243959 A1 Nov. 3, 2005

(51) Int. Cl.
*H04L 7/00* (2006.01)
(52) U.S. Cl. .......... 375/365; 375/319; 375/368; 360/51
(58) Field of Classification Search ......... 375/362–365; 360/48, 51
See application file for complete search history.

(56) References Cited

U.S. PATENT DOCUMENTS

| | | | |
|---|---|---|---|
| 6,023,386 A * | 2/2000 | Reed et al. | 360/51 |
| 6,594,094 B2 | 7/2003 | Rae et al. | |
| 6,657,802 B1 * | 12/2003 | Ashley et al. | 360/51 |
| 6,853,693 B1 * | 2/2005 | Thomas et al. | 375/343 |
| 2003/0076901 A1 * | 4/2003 | Yuan et al. | 375/319 |
| 2003/0076902 A1 * | 4/2003 | Yuan | 375/319 |

* cited by examiner

*Primary Examiner*—Shuwang Liu
*Assistant Examiner*—David Huang
(74) *Attorney, Agent, or Firm*—Ryan, Mason & Lewis, LLP

(57) ABSTRACT

A method and apparatus are disclosed for detecting a synchronization mark in a received signal. The received signal is processed to compensate for a DC bias in the received signal, such as subtracting an average of a block of received samples from each sample in the block. A distance metric, such as a sum of square differences, is computed between the DC compensated received signal and an ideal version of the received signal expected when reading the synchronization mark. The synchronization mark is detected if the distance metric satisfies predefined criteria. The ideal version of the received signal can optionally be processed to compensate for a DC bias in the synchronization mark. A search for the synchronization mark search can be limited to time cycles that match a known phase.

16 Claims, 2 Drawing Sheets

METHOD AND APPARATUS FOR SYNCHRONIZATION MARK DETECTION WITH DC COMPENSATION

FIELD OF THE INVENTION

The present invention relates generally to synchronization mark detection techniques and, more particularly, to synchronization mark detection techniques with DC compensation.

BACKGROUND OF THE INVENTION

In a communications system, it is often necessary to establish frame synchronization with the received signal. Frame synchronization is the correct temporal alignment of a data detector with the formatted, transmitted data. Typically, a known signal pattern, referred to as the synchronization mark, is transmitted on a communications channel. The receiver contains a circuit, referred to as a synchronization mark detector, that detects a synchronization condition when the synchronization mark is recognized. Thus, the synchronization condition can be used to synchronize the receiver with the transmitted data following the synchronization mark in the received signal. In a magnetic recording system, for example, data sectors on a magnetic disk are formatted to include an acquisition preamble, followed by a synchronization mark and then user data.

The synchronization mark detectors used in conventional magnetic recording systems employ a sequence detector, such as a Viterbi detector, to estimate the written binary data (e.g., NRZ data). The sequence detector simply counts the number of bit differences between a block, $b_{-L+1} \ldots b_{-1} b_0$, of NRZ bits comprising the synchronization mark, and each block, $\hat{b}_{i-L+1} \ldots \hat{b}_{i-1} \hat{b}_i$, of bits estimated by the sequence detector (where i ranges over a synchronization search window). The number of bit differences between the expected sequence and the estimated NRZ sequence, referred to as their "Hamming distance," is compared to a preset threshold. The synchronization condition is asserted when the Hamming distance falls below this threshold.

The Hamming distance detector has two significant drawbacks. First, if the Viterbi detector needs to be calibrated, e.g., in the case of a noise predictive Viterbi detector, then the detector performance depends strongly on the quality of the Viterbi calibration. Moreover, the known data mode of calibration is next to impossible without prior frame synchronization. Second, the Hamming distance detector has poor performance in DC offsets when the equalization target has DC content, as is the case for perpendicular magnetic recording systems.

A need therefore exists for improved methods and apparatus for performing synchronization mark detection. In particular, a need exists for synchronization mark detectors that do not depend on a NRZ sequence detector. A further need exists for synchronization mark detectors that are robust against DC offsets even when the equalization target has DC content.

SUMMARY OF THE INVENTION

Generally, a method and apparatus are disclosed for detecting a synchronization mark in a received signal. The received signal is processed to compensate for a DC bias in the received signal, such as subtracting an average of a block of received samples from each sample in the block. A distance metric is computed between the DC compensated received signal and an ideal version of the received signal expected when reading the synchronization mark. The synchronization mark is detected if the distance metric satisfies predefined criteria. In addition, the ideal version of the received signal can also optionally be processed to compensate for a DC bias in the synchronization mark.

The distance metric can be, for example, a sum of square differences, such as a square Euclidean distance, between the DC compensated received signal and the ideal version. The predefined criteria may require, for example, that the distance metric is below a threshold. The synchronization mark may be recorded on a magnetic medium in a magnetic recording system or may be received on a communications channel. In one variation, a search for the synchronization mark search is limited to time cycles that match a known phase.

A more complete understanding of the present invention, as well as further features and advantages of the present invention, will be obtained by reference to the following detailed description and drawings.

DETAILED DESCRIPTION

The present invention provides methods and apparatus for synchronization mark detectors with DC offset compensation. The disclosed synchronization mark detectors are based upon a Euclidean distance metric that removes the need for a Viterbi sequence detector. The disclosed synchronization mark detectors are robust against DC offsets, even when the equalization target has DC content. In one exemplary implementation, the DC compensation is implemented by subtracting the average of the block of received samples from each sample in the block, where the number of samples in the block is equal to the length of the synchronization mark to be identified.

Figure 1:
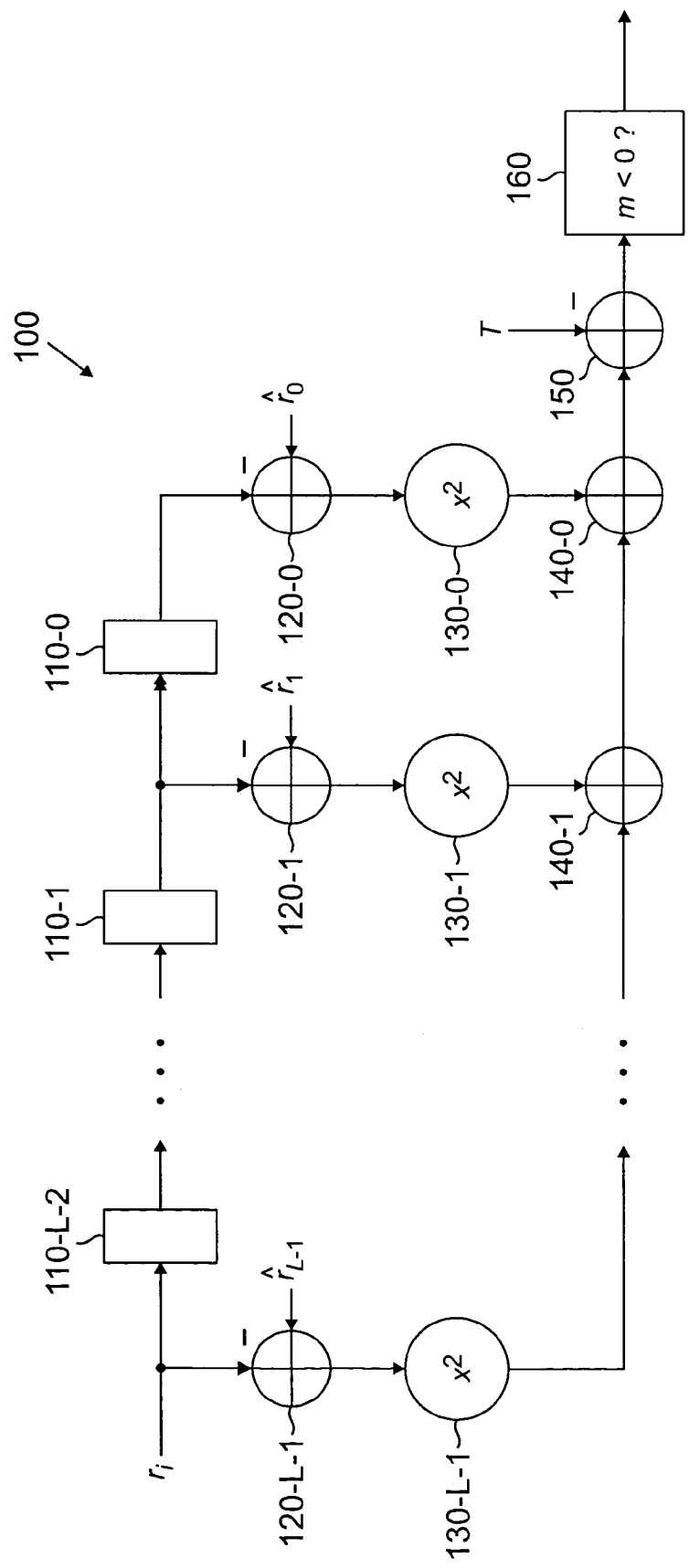
FIG. 1 is a schematic block diagram of a conventional synchronization mark detector.

FIG. 1 is a schematic block diagram of a conventional synchronization mark detector 100. As shown in FIG. 1, the conventional synchronization mark detector 100 receives an equalized signal sample at cycle i, denoted $r_i$. At the i-th cycle, the conventional synchronization mark detector 100 computes the sum of square differences, as follows:

$$\sum_{j=0}^{L-1} (r_{i-j} - \hat{r}_{L-1-j})^2 \qquad (1)$$

between the block of received samples, $\{r_{i-L+1}, r_{i-L+2}, \ldots r_i\}$, and the block of ideal samples expected when reading the synchronization mark $\{\hat{r}_0, \hat{r}_1, \ldots, \hat{r}_{L-1}\}$, where L is the length of the synchronization mark. In order to compute the sum defined by equation (1), the conventional synchronization mark detector 100 includes L−1 delay elements 110-0 through 110-L-2, to maintain the L signal samples. For each of the i cycles, the conventional synchronization mark detector 100 includes an adder 120-i for performing the subtraction between the corresponding received sample, $\{r_i\}$, and ideal sample, $\{\hat{r}_i\}$. In addition, each of the i cycles includes a squaring operator 130-i and adder 140 for performing the required squaring and summation operations, respectively.

The sum defined by equation (1), referred to as the square Euclidean distance and computed by the adder 140-0, is compared to a preset threshold T by an adder 150 and synchronization is asserted when the sum falls below the threshold, T, as determined by stage 160.

The performance of the conventional synchronization mark detector 100 can be improved in a known manner using phase search restriction techniques. It can be advantageous to write (or transmit) the synchronization mark at a fixed phase following a single-tone bit-synchronization signal (the preamble). If this is done, then a phase detector can be used to restrict the synchronization mark search to the time-cycles i that match this known phase (modulo the preamble period). For a more detailed discussion of the known phase search restriction techniques, see, for example, U.S. Pat. Nos. 6,594,094 or 6,657,802, each incorporated by reference herein.

Figure 2:
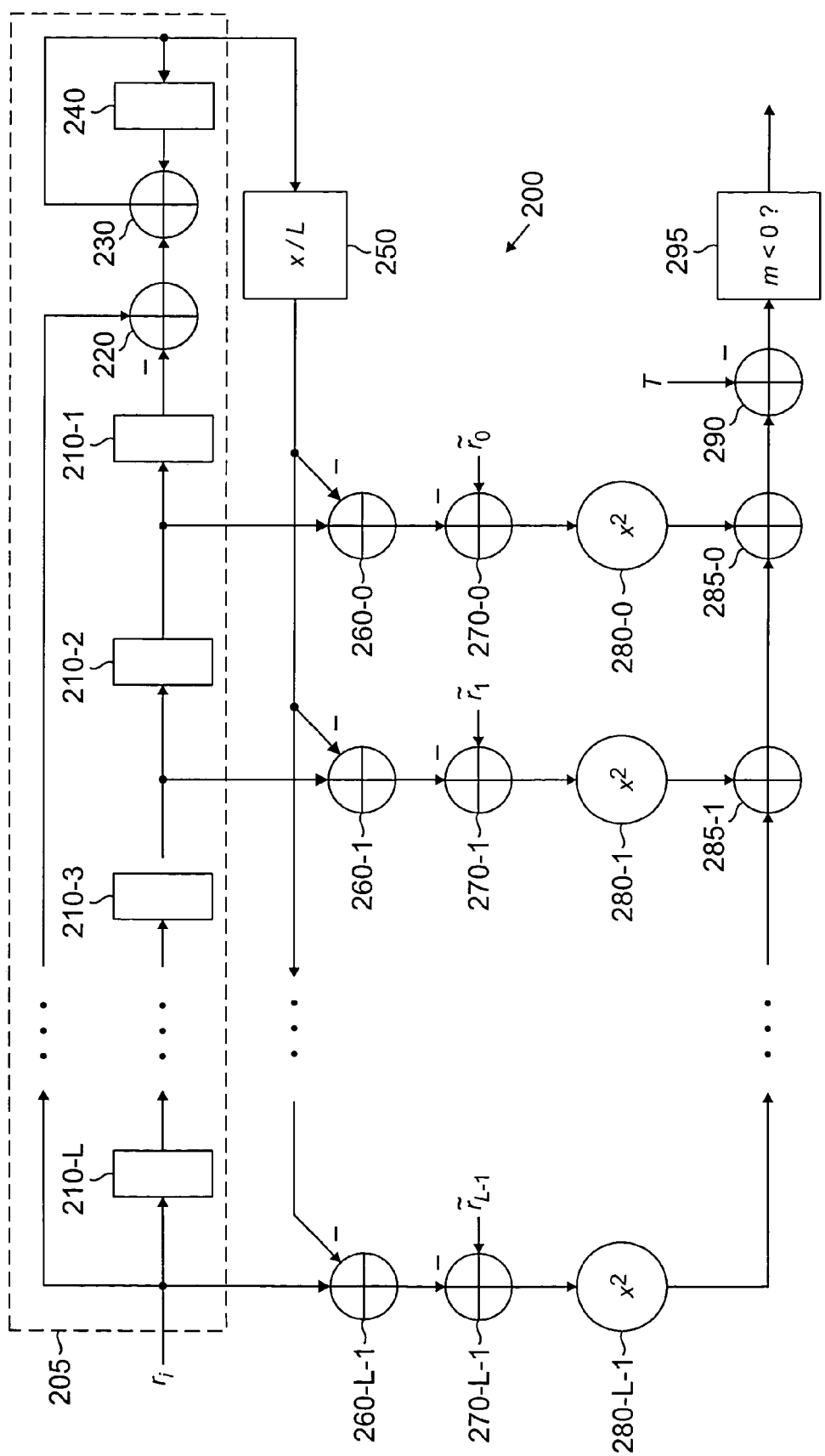
FIG. 2 is a schematic block diagram of a synchronization mark detector incorporating features of the present invention.

FIG. 2 is a schematic block diagram of a synchronization mark detector 200 incorporating features of the present invention. The present invention extends the conventional synchronization mark detector 100 of FIG. 1 to compensate for non-zero DC content in the equalized input signal. As shown in FIG. 2, the DC compensation is implemented by subtracting the average of the block of the received samples, $\{r_{i-L+1}, r_{i-L+2}, \ldots, r_i\}$, from each sample in the block, where the number of samples in the block is equal to the length of the synchronization mark to be identified. The average of the block of the received samples, $\{r_{i-L+1}, r_{i-L+2}, \ldots, r_i\}$, can be computed as follows:

$$\bar{r}_i = \frac{1}{L} \sum_{j=0}^{L-1} r_{i-j}.$$

In the exemplary implementation shown in FIG. 2, the average of the block of the received samples, $\{r_{i-L+1}, r_{i-L+2}, \ldots, r_i\}$, is computed using a known boxcar filter 205 followed by a divider 250 that divides by L. The exemplary boxcar filter 205 comprises L delay elements 210 so that an appropriately delayed version of the received signal, $r_i$, is subtracted from the current received signal, $r_i$. Generally, each of the delay elements 210 in the boxcar filter 205 are first initialized to zero. Thus, upon start up, the first received sample, $r_1$, will pass through each delay element 210 with each successive clock cycle. The adder 220 will subtract zero from the current received signal, $r_i$, until the $L^{th}$ cycle, when the first received sample, $r_1$, appears at the output of the delay element 210-1. At time $t_{L+1}$, the adder 220 will subtract the first received sample, $r_1$, from the current received sample, $r_{L+1}$. Meanwhile, an adder 230 and accumulator register 240 will add each difference value provided by the adder 220 to the previous value in the accumulator register 240. In this manner, the boxcar filter 205 accumulates the received signal over a window of size L, so that an average is provided when divided by L.

At the i-th cycle, the synchronization mark detector 200 computes the sum of square differences, as follows:

$$\sum_{j=0}^{L-1} (r_{i-j} - \bar{r}_i - \tilde{r}_{L-1-j})^2 \quad (2)$$

between the DC compensated block of received samples, $\{r_{i-L+1}-\bar{r}_i, r_{i-L+2}-\bar{r}_i, \ldots, r_i-\bar{r}_i\}$, and the corresponding DC compensated block of ideal samples expected when reading the synchronization mark, $\{\tilde{r}_0, \tilde{r}_1, \ldots, \tilde{r}_{L-1}\}$.

The DC compensated ideal sample $\tilde{r}_i$ can be precomputed from the ideal samples $\hat{r}_j$ as follows:

$$\tilde{r}_i = \hat{r}_i - \frac{1}{L} \sum_{j=0}^{L-1} \hat{r}_j.$$

It is noted that if the synchronization mark is selected such that there is no significant DC bias, then the DC compensation of the ideal samples, $\tilde{r}_i$, is not required.

For each of the i cycles, the synchronization mark detector 200 of FIG. 2 includes an adder 260-i for computing the DC compensated block of received samples, $\{r_i - \bar{r}_i\}$. In addition, each cycle includes an adder 270-i for performing the subtraction between the corresponding DC compensated received sample, $\{r_i\}$, and DC compensated ideal sample, $\{\hat{r}_i\}$. In addition, each of the i cycles includes a squaring operator 280-i and adder 285-i for performing the required squaring and summation operations, respectively.

The sum defined by equation (2), referred to as the square Euclidean distance and computed by the adder 285-0, is compared to a preset threshold T by an adder 290 and synchronization is asserted when the sum falls below the threshold, T, as determined by stage 295.

Among other benefits, the synchronization mark detector 200 of the present invention enables the use of short synchronization marks. While standard marks now a length, L, of approximately 27, the techniques of the present invention can reliably detect marks of length 14 or even 8.

As previously indicated, the performance of the synchronization mark detector 200 can be improved in a known manner using phase search restriction techniques, described, for example, in U.S. Pat. Nos. 6,594,094 or 6,657,802.

It is to be understood that the embodiments and variations shown and described herein are merely illustrative of the principles of this invention and that various modifications may be implemented by those skilled in the art without departing from the scope and spirit of the invention.

We claim:

1. A method for detecting a synchronization mark in a received signal, said method comprising the steps of:
   adjusting said received signal to generate a DC compensated received signal that compensates for a DC bias;
   adjusting an ideal version of said received signal to generate a DC compensated ideal signal that compensates for a DC bias in said synchronization mark;
   computing a distance metric between said DC compensated received signal and said DC compensated ideal version of said received signal expected when reading said synchronization mark, wherein said computation is performed prior to determining a binary value of data encoded in said DC compensated received signal; and
   detecting said synchronization mark if said distance metric satisfies predefined criteria.

2. The method of claim 1, wherein said distance metric is a sum of square differences between said DC compensated received signal and said DC compensated ideal version.

3. The method of claim 1, wherein said distance metric is a square Euclidean distance between said DC compensated received signal and said DC compensated ideal version.

4. The method of claim 1, wherein said predefined criteria require that said distance metric is below a threshold.

5. The method of claim 1, wherein said synchronization mark is recorded on a magnetic medium in a magnetic recording system.

6. The method of claim 1. wherein said synchronization mark is received on a communications channel.

7. The method of claim 1, further comprising the step of limiting a search for said synchronization mark to time cycles that match a known phase.

8. The method of claim 1, wherein said adjusting step further comprises the step of subtracting an average of a block of received samples from each sample in said block.

9. A synchronization mark detector, comprising:
- a first DC bias compensation circuit that adjusts a received signal to generate a DC compensated received signal;
- a second DC bias compensation circuit that adjusts an ideal version of said received signal to generate a DC compensated ideal signal that compensates for a DC bias in a synchronization mark;
- an adder for computing a distance metric between said DC compensated received signal and said DC compensated ideal version of said received signal expected when reading said synchronization mark, wherein said adder is configured to perform said computation prior to determining a binary value of data encoded in said DC compensated received signal; and
- a comparator for detecting said synchronization mark if said distance metric satisfies predefined criteria.

10. The synchronization mark detector of claim 9, wherein said distance metric is a sum of square differences between said DC compensated received signal and said DC compensated ideal version.

11. The synchronization mark detector of claim 9, wherein said predefined criteria require that said distance metric is below a threshold.

12. The synchronization mark detector of claim 9, wherein said synchronization mark is recorded on a magnetic medium in a magnetic recording system.

13. The synchronization mark detector of claim 9, wherein said synchronization mark is received on a communications channel.

14. The synchronization mark detector of claim 9 further comprising means for limiting a search for said synchronization mark to time cycles that match a known phase.

15. The synchronization mark detector of claim 9, further comprising a boxcar filter utilized in computing an average of a block of received samples.

16. The synchronization mark detector of claim 15, further comprising a subtractor utilized in subtracting said average from each sample in said block.

* * * * *